(No Model.)

H. D. STREATOR.
REFRIGERATOR SAFE FOR BREAD, CAKE, &c.

No. 335,157.  Patented Feb. 2, 1886.

Witnesses.
John C. Perkins
Ralph Littler

Inventor.
Henry D. Streator
By Lucius C. West
Atty.

UNITED STATES PATENT OFFICE.

HENRY D. STREATOR, OF GALESBURG, MICHIGAN.

REFRIGERATOR-SAFE FOR BREAD, CAKE, &c.

SPECIFICATION forming part of Letters Patent No. 335,157, dated February 2, 1886.

Application filed June 1, 1885. Serial No. 167,150. (No model.)

*To all whom it may concern:*

Be it known that I, HENRY D. STREATOR, a citizen of the United States, residing at Galesburg, county of Kalamazoo, State of Michigan, have invented a new and useful Refrigerator-Safe for Bread, Cake, &c., of which the following is a specification.

This invention relates to devices for preserving bread, cake, and other food from drying out, and to keep ants and other vermin from molesting the food; and it has for its object certain improvements hereinafter described and claimed.

Figure 1:
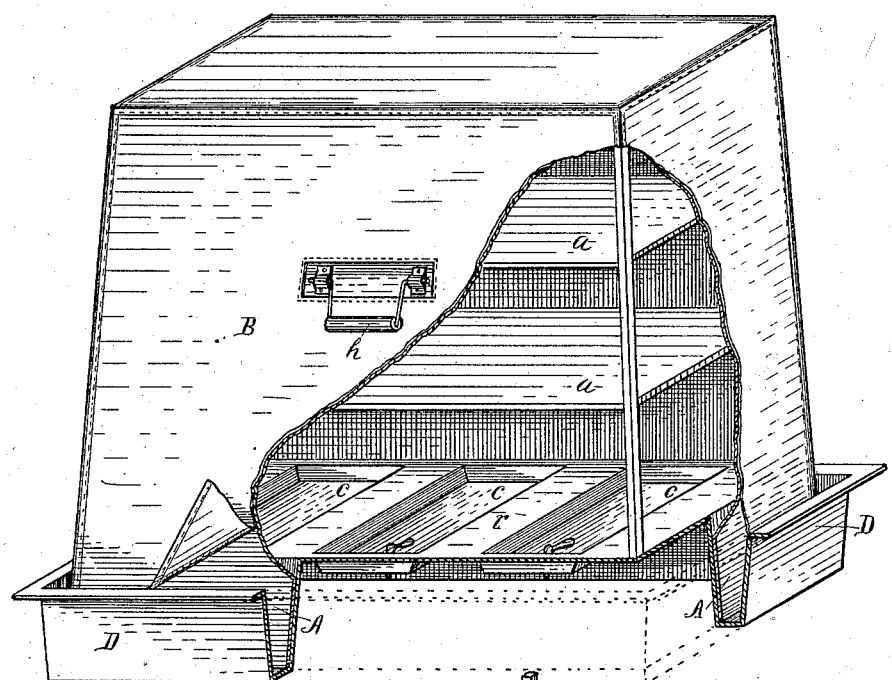
Figure 2:
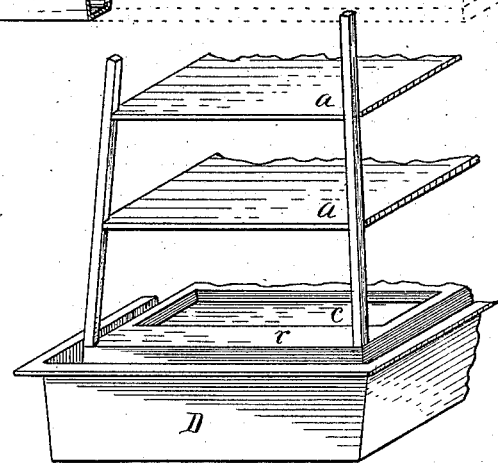

In the drawings, forming a part of this specification, Figure 1 is a perspective view with portions broken away, showing the internal construction; and Fig. 2 is a broken end perspective of parts in Fig. 1, pointed out by like letters.

Referring to the letters marked on the drawings, D is a basin having a raised center portion, $r$, with a trough around said central portion. The latter is raised a little above the outer wall of the trough.

In Fig. 1 the dotted lines show the position of the lower parts of said figure which are broken away.

The raised portion $r$ is provided in the top with open trays for holding water. The trays have stop-cocks, which are operated above instead of beneath the trays, for drawing off the water. Any suitable cocks or other means may be employed for the purpose. Above the trays are shelves $a\ a$, upon which the food is placed. Any suitable arrangement of shelves may be adopted. Butter, milk, &c., if desired, may be kept in the preserver by placing the dishes containing them on the shelves or on the raised tray portion $r$.

A is a case or cover, having an open bottom and closed top and sides, adapted to sit over the tray portion $r$ and the shelves $a\ a$, with its lower edges in the trough of the basin D.

Water is used in the trough to prevent ants and other vermin and the air from entering the chamber where the food is kept. The water in the trays $c\ c$ furnishes moisture to keep the food from unduly drying, and also furnishes the cooling element. Ice and water both may be placed in the trays, if preferred.

The casing and basin are here shown rectangular in form; but they may be rounded or circular, or any desirable form, the particular shape being a matter of choice. These parts may be made of any suitable material, of different pieces secured or soldered together, or they may be pressed in shape from sheets large enough to form the parts.

In Fig. 1 a covering or hood, B, of woolen cloth or other suitable fabric, is shown, which may be used to shield the case from the action of the outer temperature. The design is to allow the lower edges of the hood to hang in the water in the trough of the basin, so that the covering B will keep saturated with water by capillary attraction, thus making the covering more serviceable for the purpose intended, and keeping the case cool; but this covering may be used or not, as desired, and, if preferred, the lower edges may not hang in the water in the trough.

A handle is shown at $h$, coming through an aperture in the hood, to handle the case A by, a like handle being on the opposite side of the case.

Bread and cake, which would otherwise dry out and become unfit for use, may be kept in this preserver in a moist and fresh condition for many days.

Having thus described my invention, what I claim as new, and desire to secure by Letters Patent, is—

1. A food-preserver consisting of a basin having a central struck-up or raised portion, depressions in the top of said raised portion forming water-trays, and an outer casing for sitting over the raised portion, substantially as set forth.

2. The combination of a basin for holding water, a case having an open bottom adapted to sit into said basin and the water therein, and a fabric covering to said case, all substantially as set forth.

3. The combination of the water-basin, the case sitting into said basin and into the water therein, and a fabric covering to the case hanging into the water, whereby the covering is kept moistened by capillary attraction, substantially as set forth.

In testimony of the foregoing I have hereunto subscribed my name in the presence of two witnesses.

HENRY D. STREATOR.

Witnesses:
 RALPH LITTLER,
 SAM FOLZ.